United States Patent [19]

Hamada et al.

[11] 3,945,455
[45] Mar. 23, 1976

[54] STEERING LINKAGE IN WHEELED VEHICLE FOR STEERING THE VEHICLE ALONG GUIDE RAILS

[75] Inventors: Mitsuharu Hamada, Yokohama; Hiromichi Uchiyama, Tokyo, both of Japan

[73] Assignee: Nissan Motor Company Limited, Yokohama, Japan

[22] Filed: Mar. 20, 1975

[21] Appl. No.: 560,526

[30] Foreign Application Priority Data
Apr. 23, 1974  Japan.......................... 49-46160[U]

[52] U.S. Cl.................... 180/79; 104/247; 105/168
[51] Int. Cl.².......................................... B61B 13/04
[58] Field of Search.................. 180/79, 79.3, 79.2; 104/244.1, 245, 247; 280/95; 105/168

[56] References Cited
UNITED STATES PATENTS

| | | | |
|---|---|---|---|
| 2,924,875 | 2/1960 | Bourdon | 180/79.2 R |
| 3,724,584 | 4/1973 | Varichon | 180/79 |
| 3,796,165 | 3/1974 | Goode | 180/79.2 R X |
| 3,812,789 | 5/1974 | Nelson | 104/245 X |

Primary Examiner—M. H. Wood, Jr.
Assistant Examiner—R. Schrecengost

[57] ABSTRACT

A first link member branched into two straight arms at a fixed angle is pivotally supported by the vehicle body at the branching point, and the free end of the first arm is linked with a connecting rod which in turn is connected to a steering arm for a road wheel while the free end of the second arm is pivoted to an end of a straight second link member which is equal to the second arm in length, the other end of which second link member is pivoted to a middle portion of a rod supporting at the ends thereof a pair of guide wheels. The rod is provided with means to move the rod relatively to the vehicle body thereby to retract the guide wheels and rotate the second link member until it forms no angle between the second arm.

7 Claims, 4 Drawing Figures

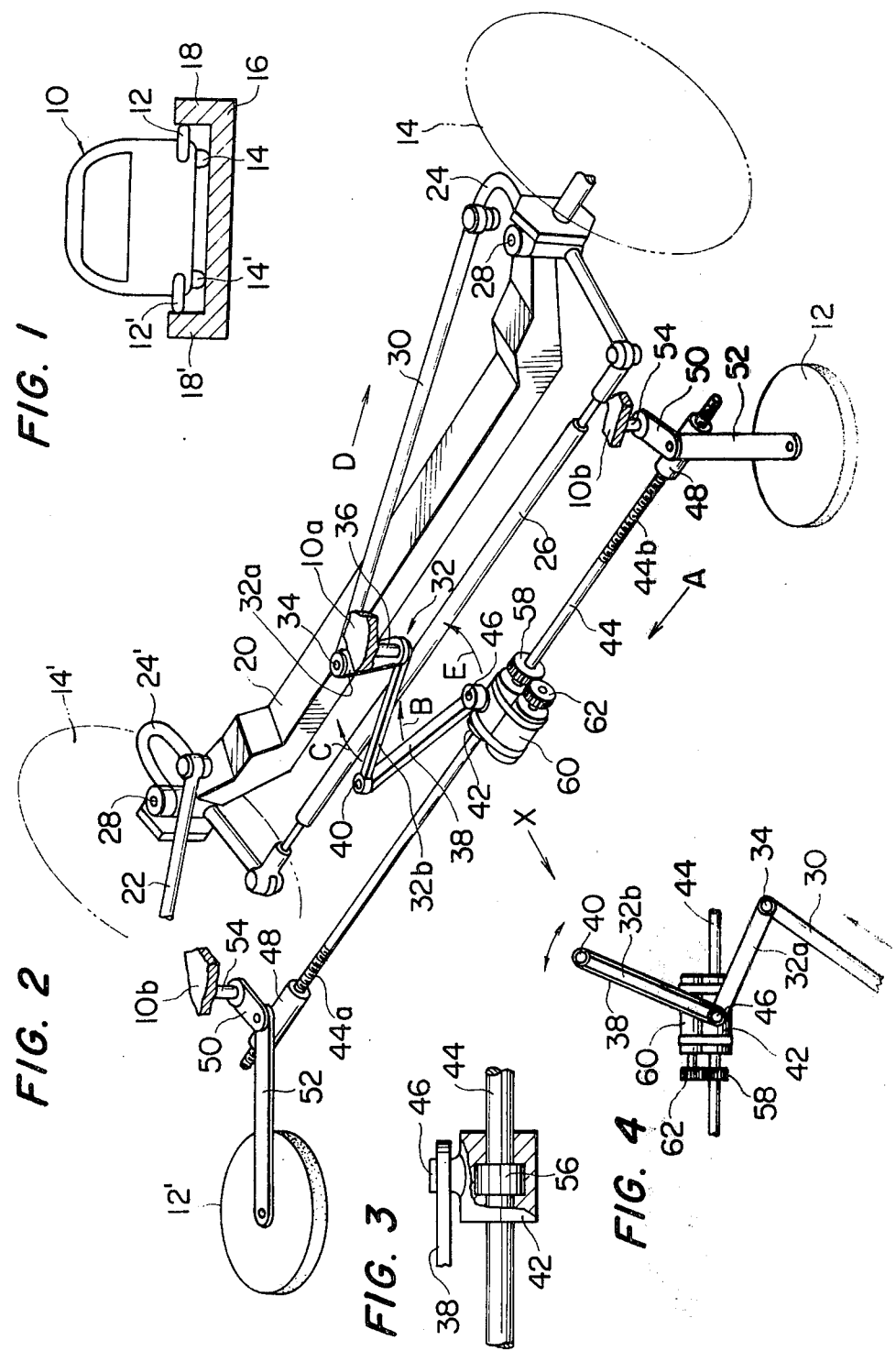

STEERING LINKAGE IN WHEELED VEHICLE FOR STEERING THE VEHICLE ALONG GUIDE RAILS

This invention relates to a steering linkage for a wheeled vehicle which has at least a pair of guide wheels other than ordinary road wheels and can be run not only ordinary roads but also on a guideway, which steering linkage allows the vehicle to be steered along guide rails on the guideway.

Currently existing overland mass transit systems are classified roughly into two groups, namely, fixed guideway rail systems such as railroads and monorails and ordinary road or highway systems typified by automobiles. The former group of systems can be operated in adequately controlled manners and maintained free from occurrence of significant traffic congestions, but can only perform transportations among predetermined points via predetermined routes. On the contrary, the latter group can meet a natural demand for practically door-to-door transits, but cannot evade from causing significant traffic congestions particularly when employed in densely populated urban areas.

Recently, therefore, a unique type of wheeled vehicle has been proposed in order to combine eclusively the respective advantages of the above-mentioned two groups. The proposed vehicle has at least a pair of guide wheels other than ordinary or road wheels, so that it can be run on either a fixed guideway provided with guide rails on which the guide wheels roll or ordinary roads. The guide rails for this vehicle may be built only in urban areas, and the vehicle may be used in other areas utterly in like manners as conventional automobiles. From a practical point of view, the guide wheels of this type of vehicle are required to be retractable so as not to disturb a free running of the vehicle on highways and other roads. Regardless of the retractability of the guide wheels, steering of this vehicle is a more important problem. On a guideway the vehicle must be automatically steered in accordance with curved guide rails, but a steering system for this purpose must not have any influence on a usual steering operation in driving the vehicle not relying on the guide wheels.

The present invention relates generally to a wheeled vehicle having at least a pair of retractable guide wheels other than ordinary or essential road wheels and has an object of providing a steering linkage for guiding the vehicle along curved guide rails of a guideway, which steering linkage is simple in construction and allows the vehicle to be steered either by reaction forces on the guide wheels from the guide rails when the guide wheels are positioned to roll along the guide rails or by means of a separate and ordinary steering system of the vehicle when the guide wheels are retracted to predetermined positions.

According to the invention, there is provided a steering linkage comprising: a connecting rod connected at one end thereof to a steering arm for steerable road wheels of the vehicle; a first link member consisting of first and second bars fixed at a first angle with each other at one end of each bar, which first link member is pivoted to a structural member of the vehicle, the extending end of which first bar is pivoted to the extending end of the connecting rod; a bar-shaped second link member which is equal to the second bar in length, an end of which second link member is pivoted to the extending end of the second bar; and a supporting rod supporting movably on each end portion thereof a bracket on which a guide wheel is mounted, which rod is movably connected to a structural member of the vehicle, the other end of the second link member being linked with a middle portion of the supporting rod such that the second link member is rotatable about an axis vertical to the longitudinal axis of the rod, wherein the second link member makes a second angle between the second bar when the guide wheels are positioned to roll on the guide rails, which second angle becomes zero when the guide wheels are retracted and the supporting rod is moved toward the first link member.

When a force on any guide wheel causes the supporting rod to move axially or slantly in the thus constructed and arranged linkage, a rotational movement of the second link member causes the first link member to rotate and push the connecting rod. When, however, the guide wheels are retracted and the second link member is positioned at zero angle from or superposed with the second arm of the first link member, any movement of the connecting rod resulting from the steering of the road wheels by the separate and ordinary steering system causes the second link member merely to rotate freely without transmitting a force to the supporting rod.

The steering linkage according to the invention has the advantages besides the simple construction thereof that the provision of this linkage needs substantially no modification of the ordinary steering system for steering the vehicle on ordinary roads, that the vehicle can be steered automatically when it runs on a guideway and that the linkage has no influence on the function of the ordinary steering system when the guide wheels are kept retracted.

The invention will be fully understood from the following detailed description of a preferred embodiment thereof with reference to the accompanying drawings, in which:

FIG. 1 is a schematic front view of a wheeled vehicle having a pair of guide wheels in a state of running along guide rails of a guideway;

FIG. 2 is a perspective view of a steering linkage according to the invention for the vehicle of FIG. 1 when the guide wheels are positioned to make contact with the guide rails;

FIG. 3 is an enlarged view of a side elevation, partly in section, of a portion of the linkage of FIG. 2; and FIG. 4 is a fragmentary plan view of the linkage of FIG. 2 when the guide wheels are completely retracted.

A wheeled vehicle 10 of FIG. 1 has a pair of guide wheels 12 and 12' at a front portion of the vehicle 10 other than ordinary wheels 14 and 14' for running on the ground. In FIG. 1, the vehicle 10 is running on a guideway 16 which has two parallel walls or guide rails 18 and 18'. The two guide wheels 12 and 12' extend laterally of and outwardly of the envelop of the vehicle body (no numeral) so as to make contact with the guide rails 18 and 18', respectively. The vehicle 10 may have another pair of guide wheels at a rear portion thereof.

Referring to FIG. 2, the front wheels 14 and 14' of the vehicle 10 are assembled with a front axle member 20 in a well known manner for conventional automobiles. Usual elements for the suspension of the body of the vehicle 10, e.g. spring members, also are assembled with the front axle, but they are omitted in FIG. 2 to avoid unnecessary complification of the illustration.

A drag link 22 connected to a steering gear arm (not shown), steering arms 24 and 24' such as knuckle arms, a tie rod 26 and kingpins 28 are assembled with each other for the steering of the front wheels 14 and 14'. This steering linkage is old and well known in the field of automobiles, so that no explanation of this linkage and the respective elements 22, 24, 26 and 28 will be needed. The drag link 22 is joined with either of the steering arms 24 and 24'; in FIG. 2, with the one indicated by the numeral 24' for the right side front wheel 14'.

According to the invention, a connecting rod 30 which serves as another drag link is joined at an end thereof with the steering arm 24 for the opposite side front wheel 14 so that the tie rod 26 may be forced to move when the connecting rod 30 makes an axial movement in like manner as in the case when the usual drag link 22 makes an axial movement. The other end of the connecting rod 30 is pivotally joined with a first link member 32 at an end of the latter 32 by means of a connecting pin 34. The link member 32 consists of two straight arms or bars 32a and 32b forming a fixed angle between them and is connected pivotally to a structural member 10a of the vehicle 10 such as the body or frame at the intersecting or branching point of the two bars 32a and 32b by means of a connecting pin 36. The angle between the two bars is preferably a right angle as shown in FIG. 4, but may be either an acute or an obtuse angle. The bar 32a which is connected with the connecting pin 30 will be designated as the first bar 32a and the other as the second bar 32b. A second link member 38 of a straight bar shape is pivotally joined with the free end of the second bar 32b of the first link member 32 by means of a connecting pin 40. It is an important feature of this linkage that the second link member 38 is equal to the second bar 32b in length. The second bar 32b and the second link member 38 make an angle other than zero when the guide wheels 12 and 12' are positioned to be in contact with the guide rails 18 and 18'. The other end of the second link member 38 is pivotally connected to a junction member 42, which is mounted on a cylindrical rod 44 explained hereinafter, by means of a connecting pin 46.

The rod 44 is arranged in a horizontal plane and in the lateral direction of the vehicle 10, i.e., parallel to the front axle member 20. Both end portions 44a and 44b of this rod 44 are threaded in the opposite directions with each other. If the right end portion 44a is provided with right-hand threads, the left end portion 44b should be provided with left-hand threads. Each of the end portions 44a and 44b is inserted into and thread-engaged with a tubular jacket member 48. A third link member 50 which connects the rod 44 to a structural member 10b of the vehicle 10 such as the body or frame and a bracket 52 which supports the guide wheel 12 or 12' at an extending end thereof are pivotally mounted on each jacket member 48. An extended end of each link member 50 is pivoted to the structural member 10b to hold the rod 44 at an equal distance from each shaft 54 for the connection.

The junction member 42 is constructed and assembled with the rod 44, for example, as illustrated in FIG. 3. The junction member 42 of FIG. 3 is shaped generally tubular with an inner diameter for loose fitting with the rod 44 and axially dividable into two pieces. The bore of the junction member 42 is enlarged at a middle portion thereof to fit with an annular flange 56 formed on the rod 44. Thus, the rod 44 cannot make any axial movement relatively to the junction member 42, but can be turned on its axis without causing the junction member 42 to turn.

Referring again to FIG. 2, the supporting rod 44 has a fixed gear wheel 58 adjacent to or close to the junction member 42, and a turning device 60 such as an electric motor is mounted on the junction member 42. The turning device 60 can turn in either direction and impart a motive force to an attached gear wheel 62, which is in engagement with the gear wheel 58 on the rod 44.

The function of the thus constructed linkage according to the invention is as follows. When the vehicle 10 runs on the guideway 16 as shown in FIG. 1, the linkage remains in a state as illustrated in FIG. 2. In this state, the guide wheels 12 and 12' are kept extended forwardly and laterally of the vehicle 10 and in contact with the guide rails 18 and 18'. The arrow X in FIG. 2 indicates the direction of the movement of the vehicle 10. If the guide rails 18 and 18' are curved to the right as viewed from the driver's position (to the left when facing the front of the vehicle 10 as in FIG. 1), the left side guide wheel 12 receives a reaction force from the guide rail 18 due to a tendency of the vehicle 10 to go on in the direction of the longitudinal axis thereof. As a result, the third link member 50 rotate about the shafts 54 clockwise in FIG. 2, and the supporting rod 44 is forced to move rightward or in the direction of the arrow A in FIG. 2. Naturally the junction member 42 makes a displacement in the same direction and causes the second link member 38 to rotate clockwise or in the direction of the arrow B in FIG. 2. This rotational movement of the second link member 38 in turn causes the first link member 32 to rotate in the same direction as indicated by the arrow C about the connecting pin 36. Consequently, the connecting rod 30 moves toward the left side front wheel 14 as indicated by the arrow D and causes the steering arm 24 and accordingly the front wheels 14 and 14' to turn to the right. Thus the vehicle 10 can be steered along the guide rails 18 and 18' without requiring any steering operation by the driver.

When driving of the vehicle 10 on an ordinary road provided with no guide rail 18 is intended, the guide wheels 12 and 12' can be retracted laterally and inwardly of the body of the vehicle 10 by the following procedure. The vehicle 10 is kept stationary, then the front wheels 14 and 14' can not easily be turned or slided due to a friction force between the wheels 14 and 14' and the road surface. Accordingly, neither the connecting rod 30 nor the first link member 32 is substantially movable in this state. Then the turning device 60 is set in motion to cause the supporting rod 44 to turn on its axis via gear wheels 62 and 58. As the supporting rod 44 makes revolutions, the jacket members 48 move toward the middle of the rod 44 since they are thread-engaged with the respective end portions 44a and 44b of the rod 44 in the opposite directions with each other. At the same time, the third link members 50 gradually rotate about the shafts 54 inwardly of the body of the vehicle 10; in other words, the left side one rotates clockwise while the right side one anti-clockwise. The supporting rod 44, therefore, makes a lateral movement rearwardly of the vehicle and causes the second link member 38 to rotate anti-clockwise as indicated by the arrow E in FIG. 2 about the connecting pin 40. The axial movement of the jacket members 48 and the lateral movement of the supporting rod 44 causes the brackets 52 and hence the guide wheels 12 and 12' to move laterally and inwardly of the body of the vehicle 10.

The operation of the turning device 60 is continued until the second link member 38 comes to a position where the second link member 38 lies parallel to or superposed with the second bar 32b of the first link member 32 as shown in FIG. 4. Since the second link member 38 is equal to the second bar 32b in length, the connecting pin 46 which joins the second link member 38 to the junction member 42 in this state is positioned coaxial with the connecting pin 36 which joins the first link member 32 to the structural member 10a of the vehicle 10. When the vehicle 10 is driven keeping the linkage of the invention in the state of FIG. 4, the front wheels 14 and 14' can be steered by a usual steering operation which causes the drag link 22 to move. The resulting change in the direction of the left side front wheel 14 causes the connecting rod 30 and the first link member 32 to move. A movement of the first link member 32 naturally causes a movement of the second link member 38. When, however, the second link member 38 is positioned as shown in FIG. 4, the resulting movement of the second link member 38 neither exerts a force on the supporting rod 44 nor offers resistance against the rotational movement of the first link member 32. Since the second link member 38 and the second bar 32b of the first link member 32 entirely lie one upon another and the two connecting pins 36 and 46 stand coaxially, the rotation of the first link member 32 about the connecting pin 36 results only in the rotation of the second link member 38 about the connecting pin 46. The connecting pin 40 which connects the second bar 32b to the second link member 38 functions neither as an axis for a rotation nor as a fulcrum for imparting a force. When the guide wheels 12 and 12' are kept in the retracted position, therefore, a usual steering operation by the use of the drag link 22 and the tie rod 26 for the front wheels 14 and 14' has no influence on the supporting rod 44 and hence the guide wheels 12 and 12'. From a reversed point of view, the provision of the steering linkage according to the invention has no influence on the function of the ordinary steering system for the front wheels 14 and 14' so long as the guide wheels 12 and 12' are kept retracted and the steering linkage is held in the state of FIG. 4.

It will be apparent that the guide wheels 12 and 12' can be extended to the positions in FIG. 2 by making the turning device 60 revolve in a direction reverse to the direction for retracting the guide wheels 12 and 12' while the vehicle 10 is kept stationary.

What is claimed is:

1. A steering linkage in a wheeled vehicle having at least a pair of retractable guide wheels other than ordinary road wheels for guiding the vehicle along a guideway provided with curved guide rails, the linkage comprising:

a connecting rod connected at one end thereof to a steering arm for steerable road wheels of the vehicle;

a first link member consisting of first and second bars fixed at a first angle with each other at one end of each bar, said first link member being pivoted to a structural member of the vehicle at the branching point of said bars, the extending end of said first bar being pivoted to the extending end of said connecting rod;

a bar-shaped second link member equal to said second bar in length, an end of said second link member being pivoted to the extending end of said second bar; and a supporting rod supporting movably on each end portion thereof a bracket on which a guide wheel is mounted, said supporting rod being movably connected to a structural member of the vehicle, the other end of said second link member being linked with a middle portion of said supporting rod such that said second link member is rotatable about an axis vertical to the longitudinal axis of said supporting rod; said second link member making a second angle between said second bar when the guide wheels are positioned to roll on the guide rails, said second angle becoming zero when the guide wheels are retracted and said supporting rod is moved toward said first link member.

2. A linkage as claimed in claim 1, wherein said first angle is a right angle.

3. A linkage as claimed in claim 1, wherein said supporting rod is cylindrical and arranged horizontally and laterally of the vehicle, and said each end portion is thread-engaged with a jacket member, said jacket member being pivoted to a third link member rotatably connected to said structural member of the vehicle at a distance from said supporting rod in a direction parallel to the longitudinal axis of the vehicle, said end portions being provided with right-hand threads and left-hand threads, respectively, said linkage further comprising a hollow junction member receiving turnably therein said middle portion of said supporting rod, said other end of said second link member being pivotally mounted on said junction member.

4. A linkage as claimed in claim 3, wherein said supporting rod has an annular flange at said middle portion, and said junction member is provided with a through and stepped bore accommodated to the outer diameters of said rod and said flange such that said supporting rod is turnable on the axis thereof without causing said junction member to turn, said other end of said second link member being pivoted to an exterior surface of said junction member.

5. A linkage as claimed in claim 4, further comprising a turning means to provide a rotatory motive force in either direction and a force-transmitting means to transmit said motive force to said supporting rod, said turning means being mounted on said junction member, said force-transmitting means being arranged such that said supporting rod is turnable on the longitudinal axis thereof in either direction.

6. A linkage as claimed in claim 5, wherein said bracket is pivoted to said jacket member by a common pivot to said third link member.

7. A linkage as claimed in claim 5, wherein said turnable means is an electric motor, and said force-transmitting means is a gear train.

* * * * *